(12) United States Patent
Han et al.

(10) Patent No.: US 12,152,652 B1
(45) Date of Patent: Nov. 26, 2024

(54) HYDRAULIC CYLINDER WITH A LINEAR VARIATION IN TENSILE AND COMPRESSION DAMPING

(71) Applicant: Zhejiang Qiangnao Technology Co., Ltd., Zhejiang (CN)

(72) Inventors: Bicheng Han, Hangzhou (CN); Jinghua Chen, Hangzhou (CN)

(73) Assignee: ZHEJIANG QIANGNAO TECHNOLOGY CO., LTD., Hangzhou (CN)

(*) Notice: Subject to any disclaimer, the term of this patent is extended or adjusted under 35 U.S.C. 154(b) by 102 days.

(21) Appl. No.: 18/471,377

(22) Filed: Sep. 21, 2023

(30) Foreign Application Priority Data

Sep. 23, 2022 (CN) .......................... 202222524415.1

(51) Int. Cl.
*F16F 9/34* (2006.01)
*F16F 9/32* (2006.01)

(52) U.S. Cl.
CPC .............. *F16F 9/34* (2013.01); *F16F 9/3235* (2013.01)

(58) Field of Classification Search
CPC ........ F16F 9/06; F16F 9/34; F16F 9/43; F16F 9/46; F16F 9/3207; F16F 9/3221; F16F 9/3235
USPC ....... 188/286, 287, 318, 300, 322.19, 322.2; 267/120, 124, 136, 221
See application file for complete search history.

(56) References Cited

U.S. PATENT DOCUMENTS

| | | | | |
|---|---|---|---|---|
| 10,557,513 | B2* | 2/2020 | Pecar | F16F 9/363 |
| 11,199,237 | B2* | 12/2021 | Anderson | F16F 9/3465 |
| 11,668,367 | B2* | 6/2023 | Kasprzyk | F16F 9/185 |
| | | | | 188/284 |
| 2023/0248548 | A1* | 8/2023 | Auberger | A61F 2/64 |
| | | | | 91/173 |

FOREIGN PATENT DOCUMENTS

CN 114151493 A * 3/2022 ................ F16F 9/19

* cited by examiner

*Primary Examiner* — Christopher P Schwartz
(74) *Attorney, Agent, or Firm* — Maier & Maier, PLLC

(57) ABSTRACT

A hydraulic cylinder with a linear variation in tensile and compression damping, which comprises a reservoir drum, a working cylinder fixedly arranged inside the reservoir drum, a piston assembly slidably connected with the reservoir drum, and a damping-adjusting valve assembly. An energy storage is arranged in the reservoir drum, and an energy-storage chamber is formed between the energy storage and the working cylinder, a working cylinder flow passage and an energy-storage flow passage are formed on an inwall of the reservoir drum, and both are connected with the damping-adjusting valve assembly. By adjusting oil flow damping in the hydraulic cylinder using the damping-adjusting valve assembly, the hydraulic cylinder can provide damping characteristics matching with force situations according to the force situations, and ensure the elastic touch and hovering at any position during use.

11 Claims, 4 Drawing Sheets

HYDRAULIC CYLINDER WITH A LINEAR VARIATION IN TENSILE AND COMPRESSION DAMPING

CROSS-REFERENCE TO RELATED APPLICATIONS

The present application claims priority to Chinese patent CN202222524415.1, named "hydraulic cylinder with a linear variation in tensile and compression damping", and filed on Sep. 23, 2022, and granted on Jan. 31, 2023, all of which is herein incorporated by reference.

TECHNICAL FIELD

The present disclosure relates to hydraulic cylinder technical field, in particular to a hydraulic cylinder with a linear variation in tensile and compression damping.

BACKGROUND

Commonly used robots or human knee joints currently mainly make the air spring support pole or the traditional constant-value damper, causing the leg posture to harden when used, damping under different bending and stretching states can not achieve an effective match, resulting in rigid posture and easy to fall in the process of walking.

The Chinese patent application CN202020576983.4 discloses a knee prosthesis and a hydraulic damper for prosthesis. The hydraulic damper for prosthesis comprises a hydraulic cylinder and an energy storage arranged on the hydraulic cylinder. A first end of the energy storage is connected with a rod chamber through a first pipeline, and the first end of the energy storage is connected with a non rod chamber through a second pipeline. The second pipeline comprises a first branch pipe and a second branch pipe arranged in parallel. A first one-way valve is arranged on the first branch pipe and a second one-way valve is arranged on the second branch pipe. Control directions of the first one-way valve and the second one-way valve are in opposite. A first control valve is arranged on the first branch pipe and a second control valve is arranged on the second branch pipe. Working process of the hydraulic damper mentioned above still does not have the linear variable function in damping, and it is not beneficial to apply the damper to different working conditions.

SUMMARY

In view of the deficiencies above, the purpose of the present disclosure is to provide a hydraulic cylinder with a linear variation in tensile and compression damping. The damping of the present hydraulic cylinder can be adjusted according to the requirements, so as to meet the requirements of different working conditions.

To solve the above technical problems, the disclosed technical scheme of the present disclosure is as follows:

A hydraulic cylinder with a linear variation in tensile and compression damping, comprises a reservoir drum, a working cylinder, a piston assembly and a damping-adjusting valve assembly; the working cylinder is fixedly arranged inside the reservoir drum, the piston assembly is slidably connected with the working cylinder. An energy storage is arranged in the reservoir drum, and an energy-storage chamber is formed between with the energy storage and the working cylinder. A working cylinder flow passage and an energy-storage flow passage are formed on an inwall of the reservoir drum, and are both connected with the damping-adjusting valve assembly.

Optionally, the working cylinder comprises a working cylinder body, an oriented end cover and a compression valve end cover. Two sides of the working cylinder body are covered by the oriented end cover and the one-way compression valve end cover respectively. The piston assembly extends into the working cylinder body through the oriented end cover. An end cover one-way valve is arranged on the oriented end cover. An one-way compression valve is arranged on the one-way compression valve end cover, and an oil return chamber is formed between the compression valve end cover and the reservoir drum.

Optionally, a working cylinder through-hole and a working cylinder waist-shaped hole are formed on a side wall of the working cylinder body, and are both connected with the working cylinder flow passage respectively.

Optionally, a mounting passage is formed in the reservoir drum, an inner wall of the mounting passage is formed with a first connection ring groove of working cylinder, a second connection ring groove of working cylinder, an energy-storage connection ring groove and a one-way valve connection ring groove. The first connection ring groove of working cylinder is connected with the working cylinder through-hole, and the second connection ring groove of working cylinder is connected with the working cylinder waist-shaped hole, and the energy-storage connection ring groove is connected with the energy-storage chamber, and the one-way valve connection ring groove is connected with the oil return chamber.

Optionally, the working cylinder flow passage includes a first working flow passage connected with the first connection ring groove of working cylinder, and a second working flow passage connected with the energy-storage connection ring groove. The energy-storage flow passage includes a first energy-storage path connected with the energy-storage connection ring groove, and a second energy-storage path connected with both the energy-storage connection ring groove and the one-way valve connection ring groove.

Optionally, the damping-adjusting valve assembly comprises a valve seat, a shift lever, an adjusting outer sleeve and an adjusting inner sleeve. The adjusting outer sleeve is installed inside the valve seat, and the adjusting inner sleeve is rotationally installed inside the adjusting outer sleeve, the shift lever is connected with the adjusting inner sleeve to drive the adjusting inner sleeve to turn round.

Optionally, an arc-shaped groove is formed on the adjusting outer sleeve, and an adjusting through-slot is formed on the adjusting inner sleeve. Turn round the adjusting inner sleeve to change the opposite area of the adjusting through-slot and the arc-shaped groove.

Optionally, the energy storage comprises an energy-storage spring, a spring end cover and a seal end cover. The seal end cover is installed on the spring end cover. Two ends of the energy-storage spring are connected with the spring end cover and the reservoir drum respectively. The energy-storage chamber is formed between the seal end cover and the working cylinder.

Optionally, the piston assembly comprises a piston plate, and a piston rod fixedly arranged on the piston plate. The piston plate is slidably installed inside the working cylinder.

Optionally, a base is installed inside the reservoir drum, a mounting ring is formed on the base. The mounting ring is arranged on and abuts against the working cylinder, an oil return chamber is formed between the mounting ring and the working cylinder. A mounting ring through-hole is formed on the mounting ring.

Beneficial effects of the disclosure: by adjusting oil flow damping in the hydraulic cylinder using the damping-adjusting valve assembly, the hydraulic cylinder can provide damping characteristics matching with force situations according to the force situations, and ensure the elastic touch and hovering at any positions during use.

DETAILED DESCRIPTION OF THE EMBODIMENTS

Figure 1:
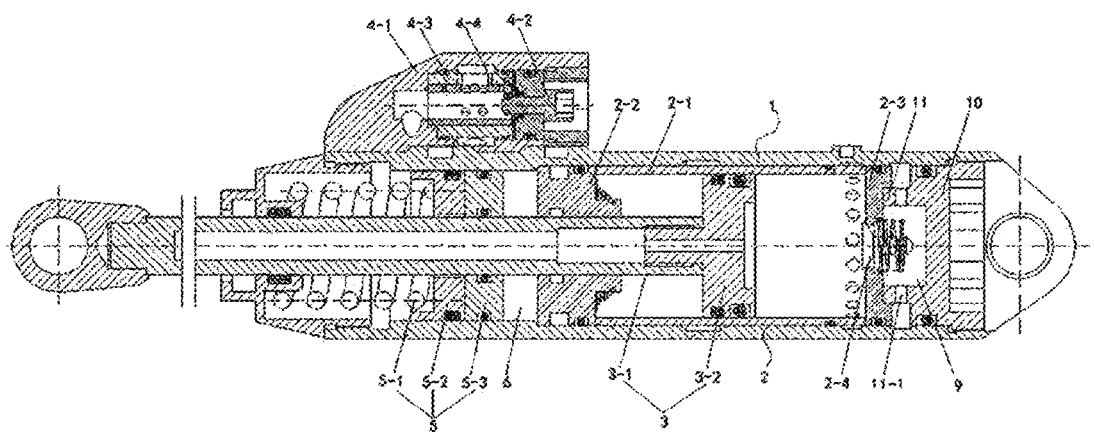
FIG. 1 is a semi-section schematic diagram view of a hydraulic cylinder with a linear variation in tensile and compression damping of the present disclosure.
Figure 2:
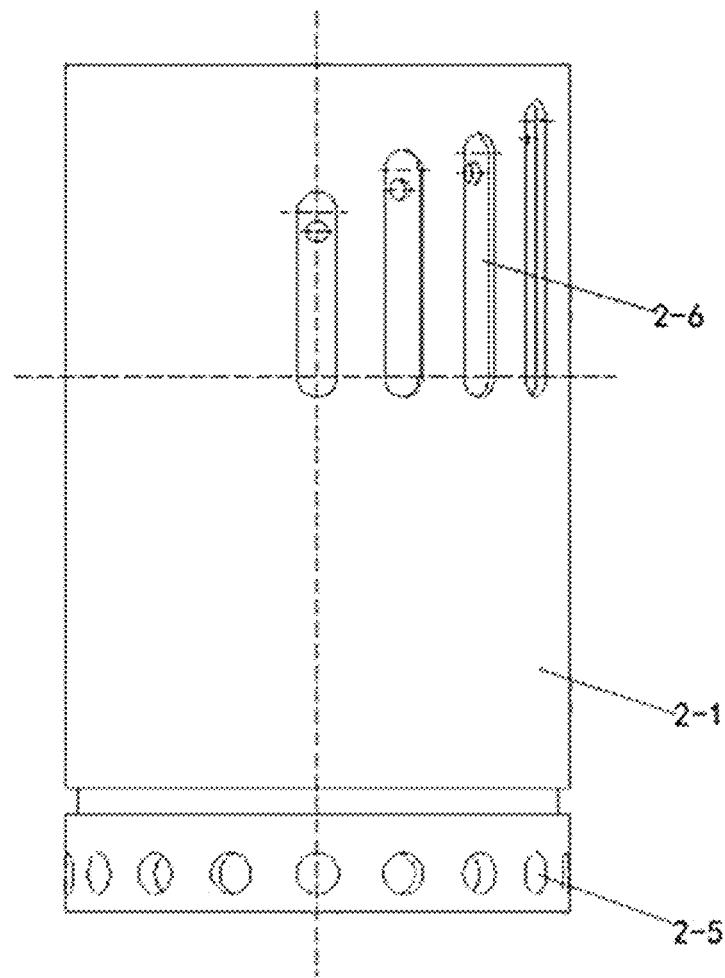
FIG. 2 is a schematic structural diagram of a working cylinder body of the present disclosure.
Figure 3:
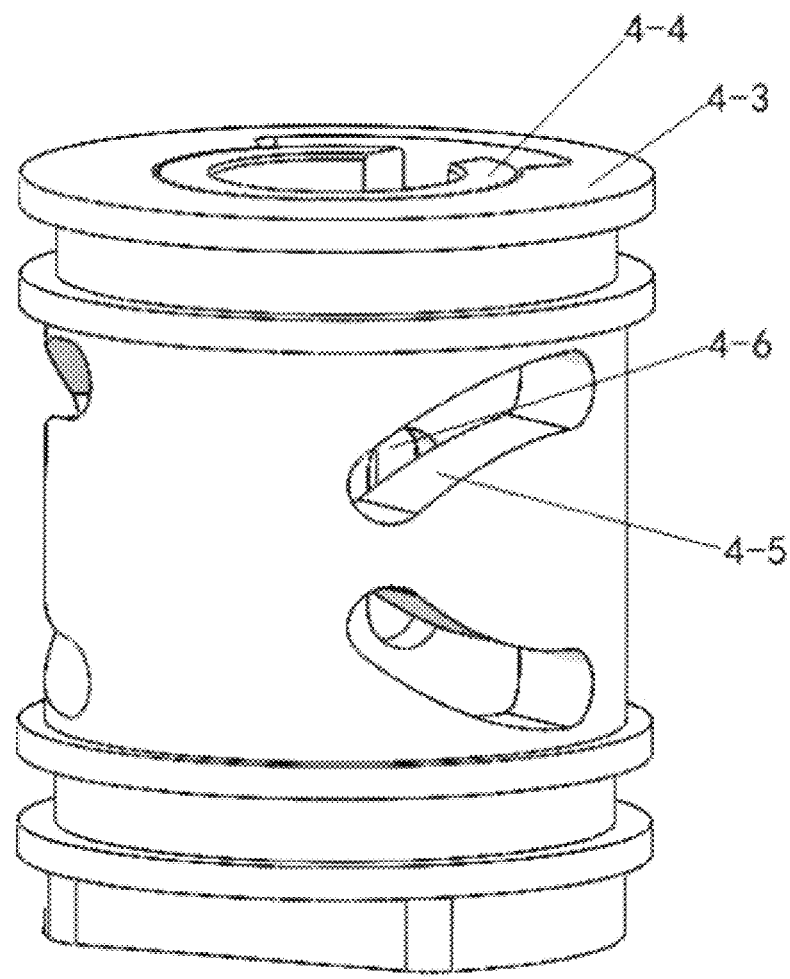
FIG. 3 is a schematic structural diagram of a damping-adjusting valve assembly of the present disclosure.
Figure 4:
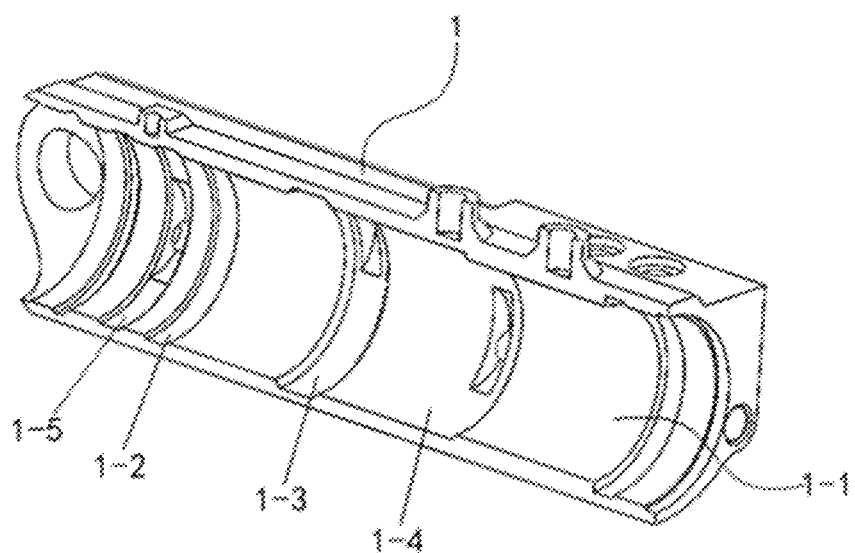
FIG. 4 is a schematic diagram of a semi-sectional view of a reservoir drum of the present disclosure.
Figure 5:
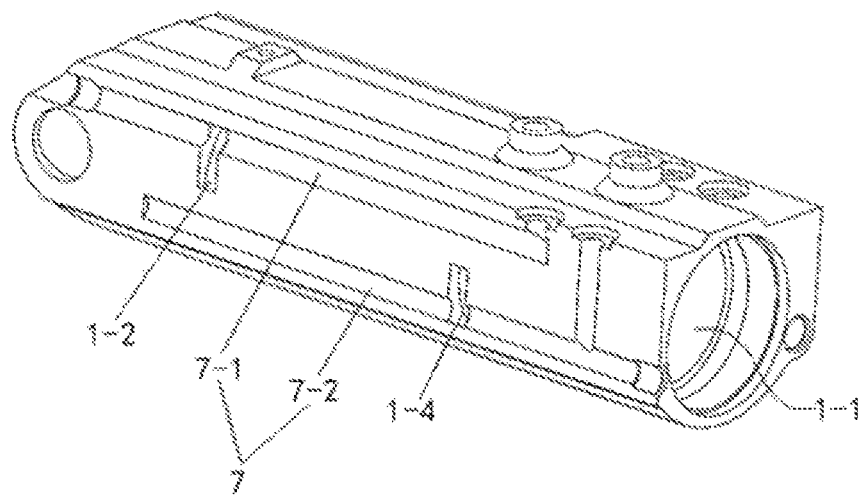
FIG. 5 is a section schematic diagram view of a working cylinder flow passage of the present disclosure.
Figure 6:
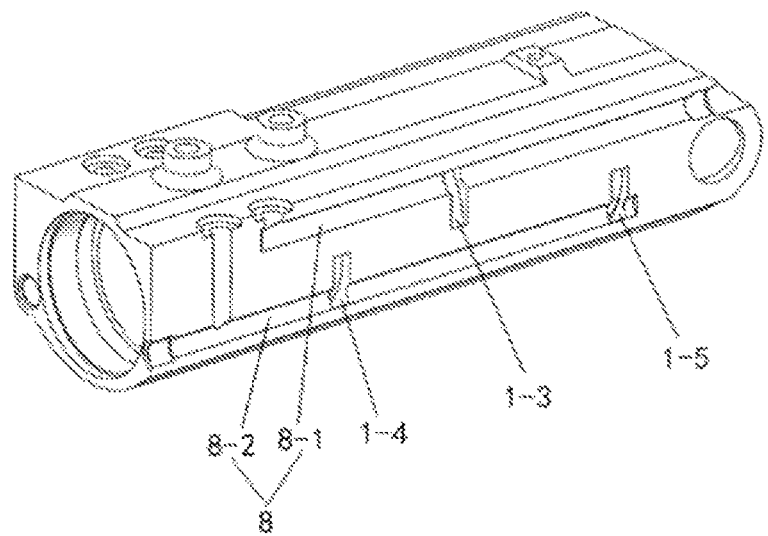
FIG. 6 is a section schematic diagram view of an energy-storage flow passage of the present disclosure.
Figure 7:
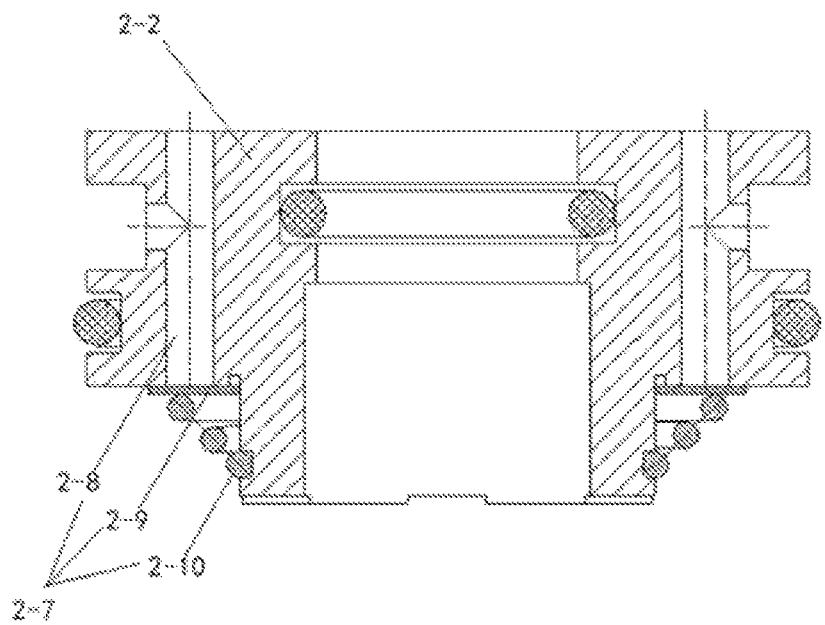
FIG. 7 is a section schematic diagram view of an oriented end cover of the present disclosure.
Figure 8:
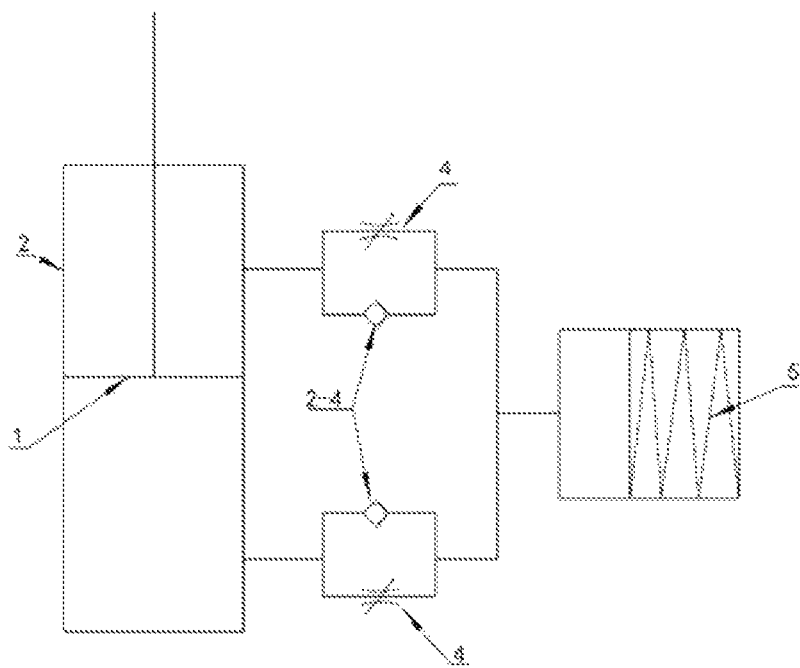
FIG. 8 is a working schematic diagram of the hydraulic cylinder of the present disclosure.

Providing a clear and complete description for the technical solutions in the embodiments of the present disclosure in combination with the accompanying drawings.

A hydraulic cylinder with a linear variation in tensile and compression damping, comprises an reservoir drum 1, a working cylinder 2, a piston assembly 3, and a damping-adjusting valve assembly 4. The working cylinder 2 is fixedly arranged inside the reservoir drum 1, the piston assembly 3 is slidably connected with the reservoir drum 1. An energy storage 5 is arranged in the reservoir drum 1, and an energy-storage chamber 6 is formed between with the energy storage 5 and the working cylinder 2. A working cylinder flow passage 7 and an energy-storage flow passage 8 are formed on inwall of the reservoir drum 1, and both are connected with the damping-adjusting valve assembly 4. During the compression process of the hydraulic cylinder, in the working cylinder 2, the oil below the piston assembly 3 flows into the damping-adjusting valve assembly 4 through the working cylinder flow passage 7, and then returns back above the piston assembly 3 of the working cylinder through the damping-adjusting valve assembly 4. During the tensile process of the hydraulic cylinder, in the working cylinder 2, the oil above the piston assembly 3 flows out of the working cylinder 2, and then flows into the damping-adjusting valve assembly 4 through the energy-storage flow passage 8, after adjusting the flow speed of the oil by the damping-adjusting valve assembly 4, the oil flows into the energy-storage chamber 6, and then the oil in the energy-storage chamber 6 flows through the energy-storage flow passage 8 to a tail end of the working cylinder 2. After that, the oil flows into below the piston assembly 3 in the working cylinder 2 through an one-way compression valve at the tale end of the working cylinder 2. By artificially adjusting the damping-adjusting valve assembly 4, the oil flow damping in the hydraulic cylinder is adjusted, so that the hydraulic cylinder can provide damping characteristics matching with force situations according to the force situations, so as to ensure elastic touch and hovering at any position during use.

The working cylinder 2 comprises a working cylinder body 2-1, an oriented end cover 2-2 and a compression valve end cover 2-3. Two sides of the working cylinder body 2-1 are covered by the oriented end cover 2-2 and the one-way compression valve end cover 2-3 respectively. The piston assembly 3 extends into the working cylinder body 2-1 through the oriented end cover 2-2. An end cover one-way valve 2-7 is arranged on the oriented end cover 2-2. During the lowering process of the piston assembly 3, the oil flows into the energy-storage chamber 6 by adjusting the damping-regulating valve assembly 4, then the oil in the energy-storage chamber 6 flows into above the piston assembly 3 in the working cylinder 2 through the end cover one-way valve 2-7. An one-way compression valve 2-4 is arranged on the one-way compression valve end cover 2-3, so as to control the oil flow return into the working cylinder body 2-1 from an oil return chamber 9. The oil return chamber 9 is formed between the compression valve end cover 2-3 and the reservoir drum 1. The oil in the energy-storage chamber 6 flows into the working cylinder body 2-1 through the one-way compression valve 2-4.

In the present embodiment, an end cover passage 2-8 is formed in the oriented end cover 2-2. An one-way valve slice 2-9 and a self-lock spring 2-10 are arranged on the oriented end cover 2-2. The end cover one-way valve 2-7 is assembled by the end cover passage 2-8, the one-way valve slice 2-9 and the self-lock spring 2-10. The one-way valve slice 2-9 is slidably installed on the oriented end cover 2-2. The self-lock spring 2-10 is connected with the one-way valve slice 2-9 and the oriented end cover 2-2 respectively. The one-way valve slice 2-9 is arranged on and abuts against an opening of the end cover passage 2-8. When the oil pressure in the energy-storage chamber increases, the oil pressure overcomes an elasticity of the self-lock spring 2-10, so that the oil flows from the energy-storage chamber 6 to above the piston assembly in the working cylinder 2.

A working cylinder through-hole 2-5 and a working cylinder waist-shaped hole 2-6 are formed on a side wall of the working cylinder body 2-1, and are both connected with the working cylinder flow passage 7 respectively. The working cylinder through-hole 2-5 is formed at a bottom of the working cylinder body 2-1. The oil below the piston assembly 3 flows out of the working cylinder body 2-1 through the working cylinder through-hole 2-5. The working cylinder waist-shaped hole 2-6 is formed on a top of the working cylinder body 2-1, so that the oil above the piston assembly 3 flows out of the working cylinder body 2-1.

A mounting passage 1-1 is formed in the reservoir drum 1. An inner wall of the mounting passage 1-1 is formed with a first connection ring groove of working cylinder 1-2, a second connection ring groove of working cylinder 1-3, an energy-storage connection ring groove 1-4 and an one-way valve connection ring groove 1-5. The first connection ring groove of working cylinder 1-2 is connected with the working cylinder through-hole 2-5, and the second connection ring groove of working cylinder 1-3 is connected with the working cylinder waist-shaped hole 2-6, it is convenient that the oil in the working cylinder 2 flows into the working cylinder flow passage 7 between the reservoir drum 1 and the working cylinder 2, thus facilitating the oil flows through the working cylinder flow passage 7 into the damping-adjusting valve assembly 4. The energy-storage connection ring groove 1-4 is connected with the energy-storage chamber 6, and the one-way valve connection ring groove 1-5 is connected with the oil return chamber 9, so that the oil in the energy-storage chamber 6 can flow into the oil return chamber 9 through the energy-storage flow passage 8, so that the reflux oil can flow into the working cylinder 2.

The working cylinder flow passage 7 includes a first working flow passage 7-1 connected with the first connection ring groove of working cylinder 1-2, and a second working flow passage 7-2 connected with the energy-storage connection ring groove 1-4. The energy-storage flow passage 8 includes a first energy-storage path 8-1 connected with the energy-storage connection ring groove 1-4, and a second energy-storage path 8-2 connected with both the energy-storage connection ring groove 1-4 and the one-way valve connection ring groove 1-5.

The damping-adjusting valve assembly 4 comprises a valve seat 4-1, a shift lever 4-2, an adjusting outer sleeve 4-3 and an adjusting inner sleeve 4-4. The adjusting outer sleeve 4-3 is arranged inside the valve seat 4-1, and the adjusting inner sleeve 4-4 is turnably arranged inside the adjusting outer sleeve 4-3. The shift lever 4-2 is connected with the adjusting inner sleeve 4-4, so as to drive the adjusting inner sleeve 4-4 to turn round. The valve seat 4-1 is connected with the working cylinder flow passage 7 to facilitate the oil to flow into the valve seat 4-1 through the working cylinder flow passage 7, and then adjust the oil damping by adjusting the adjusting outer sleeve 4-3 and the adjusting inner sleeve 4-4.

An arc-shaped groove 4-5 is formed on the adjusting outer sleeve 4-3, and an adjusting through-slot 4-6 is formed on the adjusting inner sleeve 4-4. Turning round the adjusting inner sleeve 4-4 to change the opposite area of the adjusting through-slot 4-6 and the arc-shaped groove 4-5, thus to change the flow path area of the oil, thus changing the oil damping.

The energy storage 5 comprises an energy-storage spring 5-1, a spring end cover 5-2 and a seal end cover 5-3. The seal end cover 5-3 is installed on the spring end cover 5-2. Two ends of the energy-storage spring 5-1 are connected with the spring end cover 5-2 and the reservoir drum 1 respectively. The energy-storage chamber 6 is formed between the seal end cover 5-3 and the working cylinder 2.

The piston assembly 3 comprises a piston plate 3-2 and a piston rod 3-1. The piston rod 3-1 is fixedly arranged on the piston plate 3-2. The piston plate 3-2 is slidably installed inside the working cylinder 2.

A base 10 is installed inside the reservoir drum 1, a mounting ring 11 is formed on the base 10. The mounting ring 11 is connected with and abuts against the working cylinder 2 to facilitate forming the oil return chamber 9 between the mounting ring 11 and the working cylinder 2. A mounting ring through-hole 11-1 is formed on the mounting ring 11. The oil in the energy-storage chamber 6 flows into the oil return chamber 9 through the mounting ring through-hole 11-1, and then the oil flows into the working cylinder 2 through the one-way compression valve 2-4 on the compression valve end cover 2-3.

The operating principle of the hydraulic cylinder of the present disclosure is as follows: When the piston assembly 3 is being compressed, the lower oil in the piston assembly in the working cylinder 2 flows into the first connection ring groove of working cylinder 1-2 through the working cylinder through-hole 2-5. The oil in the first connection ring groove of working cylinder 1-2 flows into the damping-adjusting valve assembly 4 through the first working flow passage 7-1. After damped by the damping-adjusting valve assembly 4, the oil flows through the second working flow passage 7-2 and the energy-storage connection ring groove 1-4 into the energy-storage chamber 6. When the oil pressure in the energy-storage chamber 6 increases, the oil pressure overcomes the elasticity of the self-lock spring 2-10, making the oil flow out of the energy-storage chamber 6, and then flow above the piston assembly in the working cylinder 2.

When the piston assembly 3 is being stretched, the oil in the working cylinder 2 flows into the second connection ring groove of working cylinder 1-3 through the working cylinder waist-shaped hole 2-6. The oil flows into the damping-adjusting valve assembly 4 through the first energy-storage path 8-1. One part of the oil in the damping-adjusting valve assembly 4 flows through the second energy-storage path 8-2 into the energy-storage chamber 6, so as to change the pressure potential energy in the energy-storage chamber 6. Another part of the oil in the damping-adjusting valve assembly 4 flows through the second energy-storage path 8-2 into the oil return chamber 9, and then flows below the working cylinder 2 through the one-way compression valve 2-4.

The above description of the disclosed embodiments enables those skilled in the art to realize or use the present disclosure. Multiple modifications of these embodiments are obvious to the skilled in the art, and the general principles defined herein may be implemented in other embodiments without departing from the spirit or scope of the present disclosure. Therefore, the present disclosure is not limited to these embodiments shown herein, but conforms to the widest range consistent with the principles and novel features disclosed herein.

Despite the use of terms, the use of other terms are used merely to describe and explain the nature of the present disclosure. The interpretation of any additional limitations is contrary to the spirit of the present disclosure.

What is claimed is:

1. A hydraulic cylinder with a linear variation in tensile and compression damping, comprising:
   a reservoir drum, a working cylinder, a piston assembly, and a damping-adjusting valve assembly; the working cylinder being fixedly arranged inside the reservoir drum; the piston assembly being slidably connected with the working cylinder;
   an energy storage arranged in the reservoir drum;
   an energy storage chamber formed between the energy storage and the working cylinder; and
   a working cylinder flow passage and an energy storage flow passage formed on an inwall of the reservoir drum, the damping-adjusting valve assembly being connected with both the working cylinder flow passage and the energy storage flow passage;
   wherein the working cylinder comprises a working cylinder body; an oriented end cover; and a compression valve end cover;
   two sides of the working cylinder body are covered by the oriented end cover and the compression valve end cover respectively;
   the piston assembly extends into the working cylinder body through the oriented end cover;
   an end cover one-way valve is arranged on the oriented end cover;
   a one-way compression valve is arranged on the compression valve end cover; and
   an oil return chamber is formed between the compression valve end cover and the reservoir drum.

2. The hydraulic cylinder according to claim 1, wherein a working cylinder through-hole and a working cylinder waist-shaped hole are formed on a side wall of the working cylinder body, and both the working cylinder through-hole and the working cylinder waist-shaped hole are connected with the working cylinder flow passage respectively.

3. The hydraulic cylinder according to claim 2, wherein a mounting passage is formed in the reservoir drum; an inner wall of the mounting passage is formed with a first connection ring groove of working cylinder, a second connection ring groove of working cylinder, an energy-storage connection ring groove and an one-way valve connection ring groove; the first connection ring groove of working cylinder is connected with the working cylinder through-hole, and the second connection ring groove of working cylinder is connected with the working cylinder waist-shaped hole; the energy-storage connection ring groove is connected with the energy-storage chamber, and the one-way valve connection ring groove is connected with the oil return chamber.

4. The hydraulic cylinder according to claim 3, wherein the working cylinder flow passage comprises a first working flow passage connected with the first connection ring groove of working cylinder, and a second working flow passage connected with the energy-storage connection ring groove; the energy-storage flow passage comprises a first energy-storage path connected with the energy-storage connection ring groove, and a second energy-storage path connected with both the energy-storage connection ring groove and the one-way valve connection ring groove.

5. The hydraulic cylinder according to claim 1, wherein the damping-adjusting valve assembly comprises a valve seat, a shift lever, an adjusting outer sleeve and an adjusting inner sleeve; the adjusting outer sleeve is arranged inside the valve seat, and the adjusting inner sleeve is turnably arranged inside the adjusting outer sleeve; the shift lever is connected with the adjusting inner sleeve, so as to drive the adjusting inner sleeve to turn round.

6. The hydraulic cylinder according to claim 5, wherein an arc-shaped groove is formed on the adjusting outer sleeve, and an adjusting through-slot is formed on the adjusting inner sleeve; the adjusting inner sleeve being turnable so as to change an opposite area of the adjusting through-slot and the arc-shaped groove.

7. The hydraulic cylinder according to claim 1, wherein the energy storage comprises an energy-storage spring, a spring end cover and a seal end cover; the seal end cover is installed on the spring end cover; two ends of the energy-storage spring are connected with the spring end cover and the reservoir drum respectively; an energy-storage chamber is formed between the seal end cover and the working cylinder.

8. The hydraulic cylinder according to claim 1, wherein the piston assembly comprises a piston plate, and a piston rod; the piston rod is fixedly arranged on the piston plate; the piston plate is slidably installed inside the working cylinder.

9. The hydraulic cylinder according to claim 1, wherein a base is installed inside the reservoir drum, a mounting ring is formed on the base; the mounting ring is arranged on and abuts against the working cylinder; an oil return chamber is formed between the mounting ring and the working cylinder; a mounting ring through-hole is formed on the mounting ring.

10. A hydraulic cylinder with a linear variation in tensile and compression damping, comprising:
    a reservoir drum, a working cylinder, a piston assembly, and a damping-adjusting valve assembly; the working cylinder being fixedly arranged inside the reservoir drum; the piston assembly being slidably connected with the working cylinder;
    an energy storage arranged in the reservoir drum;
    an energy storage chamber formed between the energy storage and the working cylinder; and
    a working cylinder flow passage and an energy storage flow passage formed on an inwall of the reservoir drum, the damping-adjusting valve assembly being connected with both the working cylinder flow passage and the energy storage flow passage;
    wherein the damping-adjusting valve assembly comprises a valve seat, a shift lever, an adjusting outer sleeve and an adjusting inner sleeve;
    the adjusting outer sleeve is arranged inside the valve seat, and the adjusting inner sleeve is turnably arranged inside the adjusting outer sleeve; and
    the shift lever is connected with the adjusting inner sleeve, so as to drive the adjusting inner sleeve to turn round.

11. A hydraulic cylinder with a linear variation in tensile and compression damping, comprising:
    a reservoir drum, a working cylinder, a piston assembly, and a damping-adjusting valve assembly; the working cylinder being fixedly arranged inside the reservoir drum; the piston assembly being slidably connected with the working cylinder;
    an energy storage arranged in the reservoir drum;
    an energy storage chamber formed between the energy storage and the working cylinder; and
    a working cylinder flow passage and an energy storage flow passage formed on an inwall of the reservoir drum, the damping-adjusting valve assembly being connected with both the working cylinder flow passage and the energy storage flow passage;
    wherein the energy storage comprises an energy-storage spring, a spring end cover and a seal end cover;
    the seal end cover is installed on the spring end cover;
    two ends of the energy-storage spring are connected with the spring end cover and the reservoir drum respectively; and
    an energy-storage chamber is formed between the seal end cover and the working cylinder.

* * * * *